United States Patent [19]

Kelly et al.

[11] 4,039,234

[45] Aug. 2, 1977

[54] WASHING MACHINE BEARING

[76] Inventors: William F. Kelly, 307 Bellevue Drive; Bobby G. Thompson, 1411 N. Main, both of Cleburne, Tex. 76031

[21] Appl. No.: 688,109

[22] Filed: May 19, 1976

[51] Int. Cl.² ............................................. F16C 33/20
[52] U.S. Cl. ................................................... 308/238
[58] Field of Search ................... 308/227, 228, 237 R, 308/238, 139, 149, 163, 157; 68/23.3

[56] References Cited
U.S. PATENT DOCUMENTS

| 3,598,460 | 8/1971 | Conrath | 308/238 |
| 3,966,276 | 6/1976 | Bellarbie et al. | 308/238 |

Primary Examiner—Joseph F. Peters, Jr.
Assistant Examiner—Gene A. Church
Attorney, Agent, or Firm—Arthur F. Zobal

[57] ABSTRACT

A bearing to be inserted between a stationary stand tube and a spin tube of a washing machine for allowing the washing machine to be quickly and easily repaired when the original spin tube bearing wears out.

9 Claims, 7 Drawing Figures

U.S. Patent    Aug. 2, 1977    4,039,234
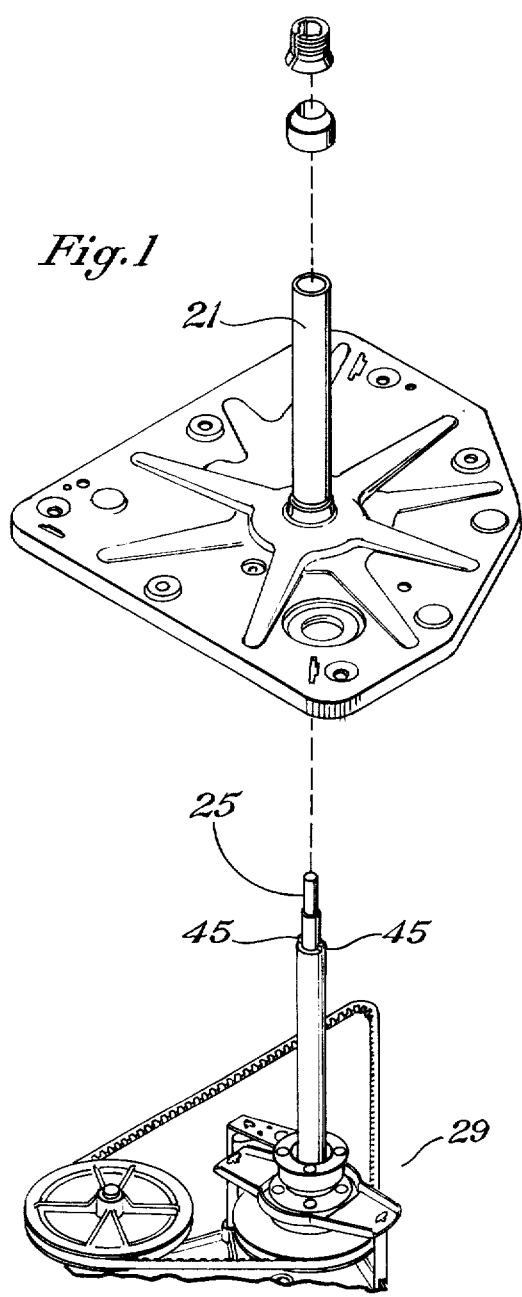
Fig.1
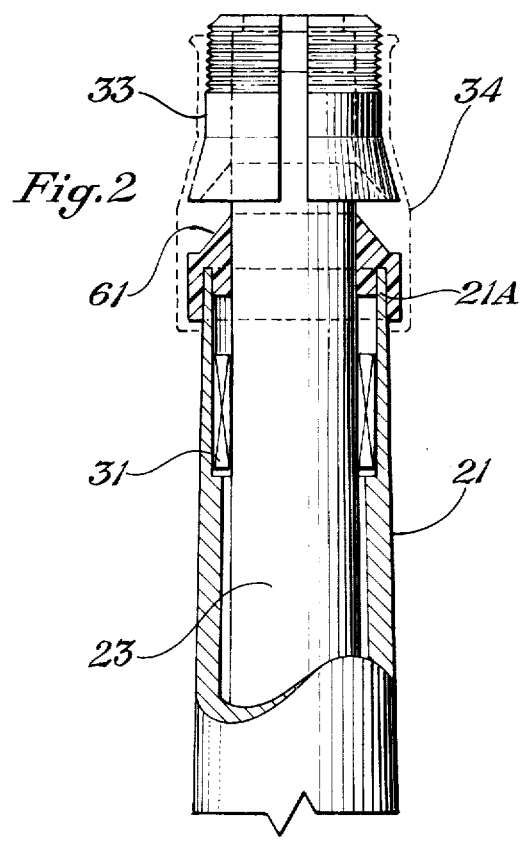
Fig.2
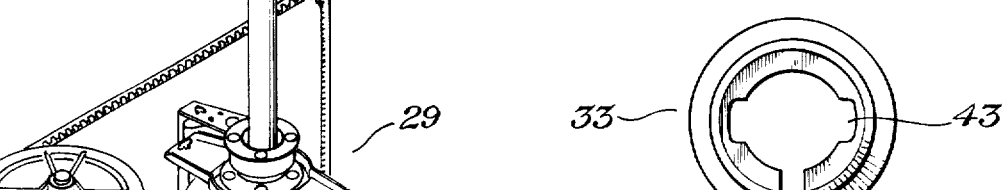
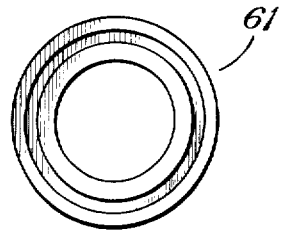
Fig.5
Fig.4
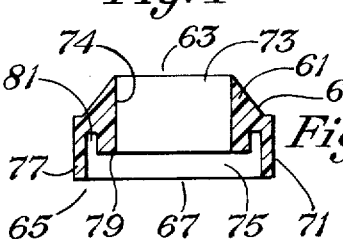
Fig.3
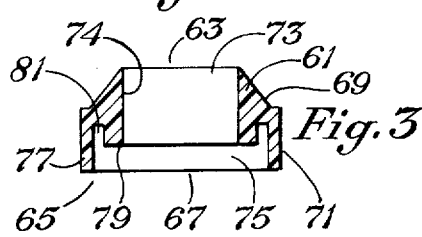
Fig.7
Fig.6

WASHING MACHINE BEARING

BACKGROUND OF THE INVENTION

Commercially available washing machines of the type having a stationary stand tube and a spin tube employ a bearing between the stand tube and the spin tube. When the bearing wears out, practically complete disassembly of the washing machine is required in order to replace the spin tube bearing. This is time consuming and hence costly. It also requires a number of parts which add to the cost.

SUMMARY OF THE INVENTION

It is an object of the present invention to provide a bearing which may be readily inserted between a stationary stand tube and a spin tube of a washing machine whereby the washing machine may be quickly and easily repaired when the original spin tube bearing wears out thereby reducing labor cost.

It is a further object of the present invention to provide such a bearing which is economical in cost.

BRIEF DESCRIPTION OF THE DRAWINGS

FIG. 1 is a partial exploded view of a portion of a washing machine employing a stationary stand tube and a spin tube;

FIG. 2 is a partial cross-sectional view of a portion of the stationary stand tube and spin tube with the original spin tube bearing in place and which also illustrates the bearing of the present invention inserted in place;

FIG. 3 is a cross-sectional side view of the bearing of the present invention;

FIG. 4 is a side view of the bearing of FIG. 3;

FIG. 5 is a top plan view of the bearing of FIG. 3;

FIG. 6 is a cross-sectional side view of a modified drive block and drive block nut which is employed in a washing machine; and FIG. 7 is a top plan view of the drive block nut of FIG. 6.

DETAILED DESCRIPTION OF THE INVENTION

Referring now to the drawings, reference numeral 21 identifies the stationary stand tube of a conventional automatic washing machine and 23 identifies the spin tube which extends through the stationary stand tube. Reference numeral 25 identifies the agitator shaft. The drive mechanism is identified at 29. Located between the stationary stand tube and the spin tube is the original bearing 31. Reference numeral 33 identifies a drive block which sets on the spin tube. An inner tub has an upper tubular extension (shown in dotted form at 34) which rides on the drive block and is held in place by a drive block nut 35 which also tightens the drive block to the spin tube 23. The drive block 33 has a central aperture 37 extending therethrough for receiving the top of the spin tube. It has a shoulder 39 at its top for supporting the drive block on the upper edge 41 of the spin tube. In FIG. 2 the drive block 33 is not shown with its shoulder 39 resting against the upper edge 41 of the spin tube. Slots 43 are formed in the shoulder 39 for receiving ears 45 of a spin tube to allow the drive block to rotate with the spin tube. A longitudinal slot 47 extends through one side of the drive block to allow the nut 35 to tighten the drive block about the spin tube when it is threaded to the drive block. The lower end 49 of the drive block is flared to support the upper tubular end of the inner tub. These components are parts of a conventional automatic Whirlpool or Kenmore washing machine.

Problems occur in such a washing machine in that the bearing 31 wears out and practically complete disassembly of the washing machine is required in order to remove the bearing 31 and to replace it with a new one.

In accordance with the present invention, there is provided a spin tube bearing which may be readily inserted in place thereby minimizing the cost of the repair. The bearing of the present invention is identified at 61 and is made of Delrin, a nylon like material although it is to be understood that may be made of nylon, brass, or bronze. The bearing 61 is an annular member and has an upper end 63 and a lower end 65 with a central aperture 67 formed therethrough for receiving the spin tube 23. The upper outer surface 69 is conical in shape and flares outward to a cylindrical surface 71 at its lower end. The aperture 67 is formed by a smaller cylindrical opening 73 and which extends to a larger cylindrical opening 75 at the lower end. Inner cylindrical surface 74 defines the bearing surface for the spin tube. The larger opening 75 defines an annular skirt 77 which extends below the edge 79 of the portion defining the bearing surface 74. An annular opening or slot 81 is formed upward from the edge 79 between the inner and outer cylindrical surfaces 74 and 71. The purpose of the annular slot 81 is to receive the upper edge of the stationary stand tube.

In repairing the washing machine, the old bearing 31 may be left in place and the new bearing 61 fitted around the spin tube and driven in place such that the upper edge 21A of the stationary stand tube fits in the annulus slot 81. The slot 81 normally has a thickness less than the thickness of the wall of the stationary stand tube, however, since the bearing 61 is made out of material that is slightly resilient or which gives, the edge of the stand tube may be forced into the slot 81 whereby the bearing 61 will be tightly held in place to the upper edge 21A of the stand tube. The aperture 73 receives the spin tube to form a bearing surface for the spin tube.

The drive block 33 has been modified in that its flared lower end has been shortened and a 45° surface 91 cut from its lower edge 93 to the opening 37. This allows the top portion of the bearing 61 to fit under the flared lower end of the drive block when the drive block rests on the upper edge of the spin tube with a clearance of about ⅛ of an inch between the conical shaped surface 69 of the bearing 61 and the 45° surface 91 of the drive block. This arrangement allows a longer bearing surface 74 to be formed in the bearing 61.

Comparison of the procedure in installing the bearing 61 of the present invention as opposed to replacing the original bearing 31 now will be given. First, there will be described the procedure for installing the bearing 61 of the present invention. The top of the machine first is raised and the inlet water hose then is disconnected and the top ring is removed from the tub assembly. The next step is to remove the agitator from the machine and also the drive block that the agitator sets on. Next the drive block nut is removed from the drive block which will enable the workman to lift the inner tub out of the machine. After the inner tub is lifted out of the machine, the drive block that the inner tub rides on is removed. At this point the workman will be able to see the spin tube, the old bearing, and seals, and the center post assembly or stationary stand tube through which the spin tube extends. The old top seal will be removed and the spin tube will be sanded where the old seal had ridden against it. The old bearing 31 will be left in place and will not be removed. The assembly will be cleaned and slightly oiled. The bearing 61 of the present invention will then be dropped down over the spin tube and driven in place over the upper edge of the stationary stand tube as described previously. After this has been done the machine is ready to be reassembled. The modified drive block as described previously then will be installed in place of the old one on top of the spin tube. The tub then will be set back in and the lock nut will be replaced on top of the modified drive block. The top ring and band then will be placed back on the tub assembly; the water hose will be reconnected and the agitator drive block placed back on the shaft. The agitator then will be placed in the washing machine and the top lowered. The washing machine now is ready for operation. An experienced service man can make this repair in approximately 20 minutes and the only necessary parts to make the repair will be the bearing of the present invention and the modified drive block. The cost of these two parts will be approximately five dollars.

The operation and procedure for replacing an original bearing 31 in the washing machine now will be described. The top is raised upward and the inlet hose disconnected. The tub ring is taken off and the agitator is removed as well as the agitator drive block. The lock nut on the tub mounting block will be loosened and the inner tub collar and drive block will be removed as well as the top seals. The machine now must be laid over on its front to allow the entire transmission assembly to be removed. This will consist of removing three bolts that bolt the transmission to the machine frame. In carrying out this operation the workman will have to disconnect the pump from the transmission before the transmission can be removed. The pump then will have to be taken from the transmission and the wires disconnected which come down to the wig-wag control. At this point the workman can remove the entire transmission and the spin tube and clutch assembly. In most cases, in doing this, the spin tube will be frozen or stuck into the old bearing and will not slide out. In most cases both springs will have to be disconnected which attach the clutch assembly and the spin tube to the transmission. The transmission then will be pulled as well as the clutch assembly and spin tube assembly. The spin tube will be worn and the clutch and spin tube assembly will have to be replaced. Once the transmission and spin tube assembly is out of the machine, the operator will have to set the machine back up in a vertical position and take a bearing remover tool and pull the old bearing out of the center post housing (stationary stand tube). The operator then will have to take an installing tool and install the new bearing in the center post housing. When this is completed, the machine must be turned back over once again on its front to replace the spin tube assembly; install the transmission; reassemble the wires to the wig-wag control; remount the pump to the transmission; and put the belt back in place on the pulleys. When the bottom is secured and back together, the operator then will upright the machine. At that time he will insert a top seal over the top bearing and will have to replace the drive collar or drive block on the spin tube. He will then have to remount the inner tub on the drive block and put the block nut back on. The tub ring then will be inserted in place; the hoses connected; the agitator drive block and agitator placed in the machine; and the top lowered. If the new clutch assembly has not been properly adjusted when it was built, the operator will have to turn the machine back over again and readjust the clutch correctly. Once this is accomplished, the machine is ready to operate. This operation takes approximately one hour and 30 minutes of labor time. Parts needed to carry out this repair consists of a new bearing kit, a new clutch assembly, and seals. Costs of the parts are approximately 20 dollars.

We claim:

1. A bearing adapted to be coupled between a stationary stand tube of a washing machine and a spin tube located in said stand tube and which extends beyond the upper end of the stand tube, said spin tube being spaced inward from the inside surface of said stand tube defining an annular space between said stand tube and said spin tube in the vicinity of the upper end of said stand tube, said bearing comprising:
   an annular member having an upper end and a lower end with a central cylindrical aperture formed therethrough for receiving the spin tube,
   said central cylindrical aperture defining an inner cylindrical surface for engaging the outer surface of said spin tube,
   said inner cylindrical surface being the closest surface to the central axis of said annular member,
   the outer surface of said annular member being conical in shape at its upper end and which flares outward to an outer cylindrical surface at its lower end,
   an annular slot formed in said annular member between said inner and outer cylindrical surfaces and which extends upward from said lower end for receiving the upper end of said stand tube.

2. The bearing of claim 1 wherein:
   said annular slot is defined by an inward facing cylindrical surface and an outward facing cylindrical surface,
   said inner cylindrical surface and said inward facing cylindrical surface being the only surfaces which face toward the central axis of said annular member.

3. The bearing of claim 1 wherein:
   the lower end of said inner cylindrical surface is spaced above the lower end of said annular member.

4. The bearing of claim 2 wherein:
   the lower end of said inner cylindrical surface is spaced above the lower end of said annular member.

5. The combination of a bearing and a drive block member, said bearing being adapted to be coupled between a stationary stand tube of a washing machine and a spin tube located in said stand tube and which extends beyond the upper end of said stand tube, said spin tube being spaced inward from the inside surface of said stand tube defining an annular spaced between said stand tube and said spin tube in the vicinity of the upper end of said stand tube,
   said bearing comprising:
   an annular member having an upper end and a lower end with a central cylindrical aperture formed therethrough for receiving the spin tube,
   said central cylindrical aperture defining an inner cylindrical surface for engaging the outer surface of said spin tube,
   the outer surface of said annular member being conical in shape at its upper end and which flares outward to an outer cylindrical surface at its lower end, an annular slot formed in said annular member between said inner and outer cylindrical surfaces and which extends upward from said lower end for receiving the upper end of said stand tube, said drive block member comprising:
- a cylindrical portion having an aperture formed therethrough for receiving the upper end of the spin tube,
- said drive block member having a flared lower end and which has a sloped inner surface which extends upward and inward from its lower edge at an acute angle relative to the axis of said drive block member until it meets said aperture formed through said cylindrical portion,
- said sloped surface of said drive block member allowing said conical shape surface of said bearing to fit partially under said sloped surface when said bearing and said drive block member are fitted in place.

6. The combination of claim 5 wherein:
the closest surface of said annular member to its central axis is said inner cylindrical surface.

7. The combination of claim 6 wherein:
said annular slot formed in said annular member is defined by an inward facing cylindrical surface and an outward facing cylindrical surface,
said inner cylindrical surface and said inward facing cylindrical surface being the only surfaces of said annular member which face toward its central axis.

8. The combination of claim 6 wherein:
the lower end of said inner cylindrical surface of said annular member is spaced above the lower end of said annular member.

9. The combination of claim 7 wherein:
the lower end of said inner cylindrical surface of said annular member is spaced above the lower end of said annular member.

* * * * *